A. J. Adams,
Jaw Trap.
N° 77,157.  Patented Apr. 28, 1868.
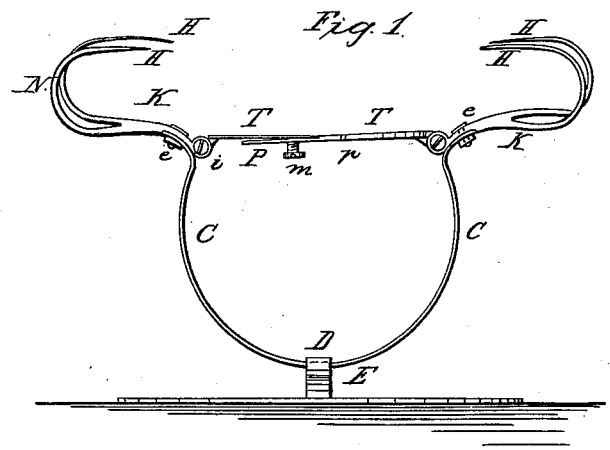
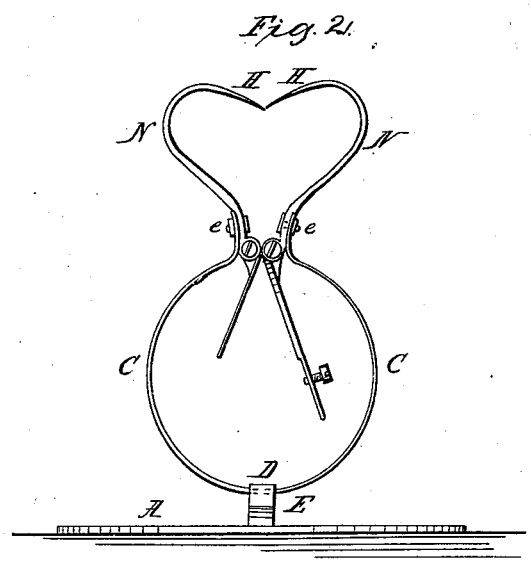
Witnesses:
Alex. F. Roberts
J. A. Service
Inventor:
A. J. Adams
per Munn & Co
Attorneys

United States Patent Office.

A. J. ADAMS, OF PORTLAND, OREGON, ASSIGNOR TO HIMSELF AND BOYD P. QUINCY, OF SAME PLACE.

Letters Patent No. 77,157, dated April 28, 1868.

IMPROVED ANIMAL-TRAP.

*The Schedule referred to in these Letters Patent and making part of the same.*

TO ALL WHOM IT MAY CONCERN:

Be it known that I, A. J. ADAMS, of Portland, in the county of Multnomah, and State of Oregon, have invented a new and improved Animal-Trap; and I do hereby declare that the following is a full, clear, and exact description thereof, which will enable others skilled in the art to make and use the same, reference being had to the accompanying drawings, forming part of this specification.

Figure 1 is a perspective view of my trap when set.

Figure 2 is a view of the trap when sprung.

Similar letters of reference indicate corresponding parts.

This invention consists in providing the extremities of a circular spring with hooks, and extending them apart, by means of two flattened props, which are fitted with a device for maintaining them as set, as will be more fully shown and explained.

A is a base or pedestal, having the spring C secured to the middle of a cross-piece, E. The spring C is attached at its middle also, and the manner of attaching the same, namely, a cap-piece, D, riveted over the springs, thus avoiding the weakening of the spring by a hole, is shown in the drawing. Both ends of the spring are armed with a claw, N, of two hooks, and the claws are attached by bolts and nuts, shown at e e in both figures.

The hooks, H H, of each claw are attached to a shank, K, which is bolted to the spring, as aforesaid, and the rear of this shank is fitted with a hinge, by which a movable treadle, T T', is attached.

These treadles are triangular surfaces, and their bases or free ends, when placed in horizontal contact, serve to keep the claws extended apart, as shown in fig. 1.

Underneath the edges of contact of the treadles, there extends a projection, P, forming a part of the treadle T'. This forms a bearing for the other treadle, T, whereby both are kept in a horizontal position, thus holding the hooks apart, for the hinge-centres i i and the edges of the treadles are not in a true line, the edges being a very little raised, thus bringing the projection P to bear against the treadle T, and steady both treadles.

A set-screw, m, is placed in the projection P, for the purpose of adjusting the line of the hinge-centres and contact of the edges, so that, by thrusting the screw against the treadle T, the line of said centres and contact will be made to approach more nearly to a straight line, where the delicacy of the adjustment will be increased, and but a very small pressure upon the upper face of the treadles suffice to spring the trap. Two holes, r r, in the treadle T', are for securing the bait thereto by a string.

In setting the trap, the bait is placed upon the treadles, and secured to one of them. The edges are placed in contact, as before described.

The bait is then midway between the two claws, and the animal, attracted by the bait, in bringing his weight, or a portion of it, upon the treadles, or by bearing upon them with his head, or in any other way pressing the treadles out of their line of equilibrium, thus springs the trap.

The hooks of each claw are antagonistic to those of the other, and, when sprung together, strike into whatever is in the space above the treadles shown by fig. 2. When the trap is sprung, the treadles hang vertically within the branches of the spring C.

The treadles can be inverted by unscrewing the pins forming part of their hinges, and replacing them with the treadles in an inverted position, whereby the claws can be made to operate when inverted also, thus making the trap available in both positions.

The advantages claimed for this invention are its simplicity, durability, and inexpensive character.

I claim as new, and desire to secure by Letters Patent—

The spring C and claws K, in combination with the hinged treadles and the base A E, all constructed, arranged, and operating substantially as described.

A. J. ADAMS.

Witnesses:
 H. C. BENSON,
 S. G. BENSON.